United States Patent Office 3,565,750
Patented Feb. 23, 1971

3,565,750
PRESSURE-SENSITIVE ADHESIVE ARTICLE
WITH DRY-STRIPPABLE LINER
Jack L. Evans, White Bear Lake, Minn., assignor to Minnesota Mining and Manufacturing Company, St. Paul, Minn., a corporation of Delaware
No Drawing. Continuation-in-part of abandoned application Ser. No. 467,127, June 25, 1965. This application May 19, 1969, Ser. No. 826,011
Int. Cl. B32b 7/06, 27/32
U.S. Cl. 161—208                                6 Claims

ABSTRACT OF THE DISCLOSURE

Pressure-sensitive adhesive sheet material is provided with a release liner which is a smooth thin planar-rigid polyolefin film having an inseparably-bonded cured silicone-polymer coating which provides dry-strippable release action.

CROSS-REFERENCE TO RELATED APPLICATION

This application is a continuation-in-part of copending application Ser. No. 467,127, filed June 25, 1965, now abandoned.

BACKGROUND OF THE INVENTION

This invention relates to a novel low-adhesion release liner and its use for temporarily supporting or covering an aggressively-tacky pressure-sensitive adhesive coating carried by an adhesive tape or sheet or other article. The liner makes adherent contact with the tacky surface and is dry-strippable so that it can be readily manually removed whenever desired without wetting.

It is well known to protectively cover the face of normally tacky and pressure-sensitive adhesive tape with a removable liner. The adhesive-contacting portion of the liner is typically provided with a low-energy surface to which the tape sticks only lightly and from which the tape can be readily removed. The liner surface must not delaminate, rub off, or otherwise transfer to the adhesive, lest the ability of the adhesive to perform its intended function thereby become impaired. Quantitative tests to measure these characteristics have been devised, as will now be shown.

To determine the force required to strip a tape from a liner, a strip of the test tape 1 inch wide x 10 inches long is applied to a strip of liner 1½ inches wide x 10 inches long and rolled down with one pass of a 4½ lb. rubber-covered roller. One end of this liner-tape composite is attached, by means of a clamp and hook arrangement, to a point on the lower periphery of a horizontal, 3 inch-diameter aluminum cylinder which is located in an oven. The liner-tape composite is then looped over the cylinder, tape-side out, and a 500-gram weight attached to the other end. While thus under stress, the composite is then aged for 16 hours at 150° F.[1], after which it is removed to a 72° F., 50% relative humidity environment for about 2 hours. "Stripback" adhesion value is then obtained by wrapping the composite tape-side out, around a 3-inch diameter free-turning spindle, and stripping the tape away from the liner at a 90° angle at 90 inches per minute while measuring the stripping force in grams or ounces per inch of width.

An effective release liner should provide a stripping force of no more than about 150 grams per inch of width, even with extremely aggressive adhesives. Preferably this value should not exceed 100 grams per inch and for many adhesives it will be less than 30 grams per inch. These values are particularly important in the case of wide strips of easily stretchable tape, which may otherwise become badly distored during removal from the liner.

To determine whether the liner deleteriously affects the adhesive, a strip of tape, aged as described above, is removed from the liner, applied to a clean glass surface, rolled down with one pass of a 4½ lb. rubber roller, and stripped from the glass at a 180° angle at 90 inches per minute while measuring the adhesion value in ounces. This value is compared to that obtained using as a control the same tape which has been kept out of contact with the liner. Assuming that the adhesive is not adversely affected by heat alone, the adhesion to glass after aging should be at least 80% of the control. If part of the liner's adhesive-contacting surface transfers to or reacts with the adhesive, this percentage will be significantly lower.

The only adhesive-contacting liner surfaces which have proved able to impart the characteristics just described are perfluoroethylene polymers and certain polysiloxanes, or silicone-polymers. Since the former are both extremely expensive and extremely intractable, no economically feasible way has been found to utilize them in liner manufacture. Liners are considered "throwaway" itms, and it is important that their cost be minimal.

Polysiloxanes, which can be applied in solutions and thereafter crosslinked at high temperatures, have been extensively used as coatings for paper-based liners. Paper provides an economical body material which can resist the temperatures required to cure the polysiloxane and which is stiff enough to facilitate separation of the tape (which is often quite flexible) and the liner at the time of use.

Despite its just-mentioned advantages as a liner body, paper has significant drawbacks. It is greatly affected by moisture, tending to expand in high humidities and contract in low, thereby making it difficult to maintain tightly wound, uniform rolls. This problem is accentuated by the fact that, for adequate strength, paper liners must either be relatively thick (which decreases the amount of usable tape in a convolutely wound tape-liner roll) or impregnated with resins (which not only increases the cost but also inhibits silicone anchorage).

For many years prior to the present invention, self-sustaining films of various polymers (e.g., polyethylene and isotactic polypropylene) had been commercially available. Some of these films provided strength equal to paper, at lesser thicknesses, were relatively unaffected by moisture, and were less expensive than paper. Such films could not be used per se as low release liners of the type herein described, however, because the stripback adhesion was at least about an order of magnitude greater than could be tolerated. Nor, unfortunately, could such films be provided with a polysiloxane coating in the same manner as paper; not only did the curing temperatures required exceed the softening point of the film but, even when extraordinary handling conditions were employed, the polysiloxane coating failed to adhere to the normally inert, polar and hydrophobic surface of the films.

Attempts to improve adhesion of polysiloxane to a substrate by blending it with some other resin proved self-defeating, since stripback adhesion was increased to an intolerable level.

Prior to the present invention, then, the only available release liners were polysiloxane-coated paper.

SUMMARY

The present invention provides, for the first time, a film-based low-release liner for normally tacky and

[1] Believed to correspond to 6–12 months of aging under normal conditions.

pressure-sensitive adhesive sheet material. The liner is thin, (1–4 mils, and preferably about 3 mils), uniform and unaffected by even extreme humidity changes in the environment where it may be used. The body of the liner is formed from a polyolefin film, specifically certain high density polyethylene or isotactic polypropylene films. A particularly preferred material is isotactic polypropylene film which has been extruded and then quenched without further orientation. The film-forming polymers preferably include dispersed pigment (e.g., $TiO_2$) for opacification and for making the film somewhat stiffer and more paper-like in handling qualities. The film may be termed "planar-rigid," indicating relative stiffness and inextensibility, preventing it from materially stretching or distorting under normal manufacturing or use. The film may also be given any desired degree of translucency by imparting a dull or matte finish to one or both sides. Such a film is more readily visible, and the matte surface can be marked or written upon with a pencil.

The adhesive-contacting surface (or surfaces) of the liner is provided with a firmly-anchored cured polysiloxane coating which does not smear or transfer to the adhesive, even after lengthy contact, and from which even tapes having extremely aggressive adhesives can be stripped away with a force of no more than 150 grams per inch of width. Unlike paper, the dense film will never split or rupture during removal.

The smooth film surface of the liner permits of continuous intimate contact with smooth-surfaced adhesive coatings and exposes a smooth adhesive surface when stripped off, resulting in better contact to the surface to which the adhesive will be applied than is the case with creped or embossed liners. A further advantage to the smooth liner surface is that the adhesive is sealed from the atmosphere and thus protected from possible deterioration that might result during lengthy storage if the atmosphere could diffuse in from the edges.

It has been found empirically that liners effective in the practice of this invention are made from polyolefin polymers having an intermediate molecular weight range as indicated by the melt value. (Measured in accordance with ASTM Test D1238–62T, the melt index of polyethylene should be 0.2–6.0 dg./minute and the melt flow of polypropylene should be 2–10 dg./minute.) Films made from polymers having a lower molecular weight are too brittle for use as liners, while polymers having a higher molecular weight cannot practically be extruded as film.

It has likewise been empirically determined that certain other parameters are useful in determining whether a given polyolefin film can be employed in making a liner in accordance with the invention. For example, since the liner may serve as a carrier web during manufacture of the adhesive sheeting, it has been found that elongation of the film, when subjected to a tensile stress of 250 p.s.i. at 200° F. for 3 minutes, should not be more than 5%. Similarly, it has been found that the flexural modulus i.e., $$\frac{\text{flexural rigidity}}{\text{thickness}^3}$$

should be at least $6.0 \times 10^5$ gms./cm.$^2$ to simplify handling of the liner during manufacture and facilitate removal from the tape product at the time of use. The flexural rigidity value is obtained in accordance with ASTM Test D1388–64.

The stiffness modulus value is calculated by measuring the tensile force at 2% total extension in accordance with ASTM Test D638–64T, rate of extension 10%/minute, and calculating the secant modulus, which gives a relative indication of the rigidity or stiffness, of the film. For use in practice of my invention, I have found that the stiffness modulus value for polyethylene should be in the range of 50,000 to 80,000 p.s.i., and for polypropylene, it should be in the range of 60,000 to 100,000 p.s.i.

As previously indicated, the surfaces of polyolefin films are hydrophobic and notoriously unreceptive to silicon coatings. I have learned, however, that the surfaces can be activated and rendered hydrophilic and receptive to silicon coatings by exposure to a flame treatment or electrical discharge, e.g., as described in U.S. Pat. 3,118,534. Such activation affects only the superficial portion of the film, introducing active sites and groups which will bond to hydrophilic polar groups of the silicon-polymer.

Polypropylene and polyethylene films which have been surface activated by such treatment are commercially available. For example, a 3 mil white opaque isotactic polypropylene film that has been activated on both sides (presumably by corona treatment) and is suitable for present usage is obtainable under the "Olefane" brand name from Avisun Corp., Philadelphia, Pa. A similar film that has been activated by flame treatment is obtainable from Marathon Division of American Can Co. (Neenah, Wis.).

It has also been empirically determined that for my purposes effective silicone coatings are those which can be cured on a substrate at 200° F. (or less) in 4 minutes (or less) to a state where it cannot be removed or rolled up by rubbing with a pencil eraser or the thumb. The silicones which for years have been applied to paper in preparing release liners (essentially dimethyl polysiloxane cured with, e.g., stannous octoate or dibutyl tin dilaurate) are unsuitable for practicing the present invention. Silicone polymers which I have found particularly effective for my purposes are applied from a dilute solution, in a volatile hydrocarbon solvent, of a composition containing: (A) a silicon release polymer which is a predominately polydimethylsiloxane that is poly-functional (at least difunctional) in silanol hydroxy groups or groups hydrolyzable to silanol hydroxyls; and (B) a small proportion (about 5 to 1%) of a cross-linker which is a hydrolyzable poly-functional silane or siloxane (either the monomer or a low polymer), capable of ready reaction with moisture to provide silanol hydroxyls. Thus under hydrolyzing curing conditions both components are poly-functional in silanol hydroxy groups. The two components are present in the solution either as separate compounds or in a partially coreacted state (partially precured state); the system being selected such that it is capable of fully curing at the times and temperatures previously mentioned. A catalyst which promotes condensation of silanol hydroxyls is preferably included.

The liquid silicone polymer coating composition provides a release coating that is formed in situ in contact with the activated substrate surface of the polyolefin film by the conjoint effect of evaporation of the volatile vehicle, hydrolysis of the silicone polymer to provide hydroxy groups if not already present, or hydrolysis of the poly-functional cross-linker compound (curing agent) to provide hydroxy groups, or both, followed by condensation to crosslink and thereby "cure" the polymer by forming a three-dimensional insoluble polymer coating. At the same time the hydroxy or other active groups coact with the active sites in the hydrophilic film surface to provide strong physicochemical interbonding that integrates the polymer coating and the film.

It is believed that the fluid state of the coating solution permits of molecular orientation such that active hydrophilic groups not involved in crosslinking of the polymer molecule will be adsorbed by the hydrophilic activated substrate film surface, while nonpolar groups (such as methyl groups attached to the backbone structure) will tend to be present in and to remain in the exterior surface of the coating as it forms a dried solidified film coating, thereby resulting in an exterior surface which is hydrophobic and capable of anti-stick release action. The amount of silicone solids applied in accordance with this invention may be extremely small, on the order of 0.3 grain per 24 square inches (about 1.3 grams per square meter) the thickness of the dried and cured coating preferably being on the order of 1 micron or less.

It is desirable to employ polymer coating systems capable of being cured in a short time at temperatures below the melting or softening temperature of the polyolefin film. The hydrolyzable or hydroxy silicone polymer and cross-linking agents, referred to above, permit of such moderate temperatures even when curing is effected during a period of 5 minutes or less. Use of a cross-linker which readily reacts with atmospheric moisture during heating of the coated film, thereby hydrolyzing, is desirable. Moisture can be supplied by steam introduced into the air atmosphere of a drying oven through which the coated film is passed for drying and curing of the silicone release coating.

This liner has particular value when the pressure-sensitive adhesive coated article is not a conventional narrow-width tape but is a wide-width tape or sheet such that dry-stripping of the liner is across a width of 8 to 36 inches (about 20 to 90 cm.). In such cases the adherency per unit of width must be especially low to avoid an excessive total removal force and the liner must have a construction such that it will not break, split, tear nor appreciably distort during removal.

Thus, the present release liner has notable value for use in conjunction with a double-coated pressure-sensitive bonding or laminating tape such as one comprised of a polyvinyl chloride film coated on both sides with a highly tacky rubber-resin adhesive and supplied in rolls which may have a width of 8 or more inches (20 cm. or more). In this case the film liner, which is provided with a low-adhesion silicone-polymer release surfacing on both sides, is interwound with the double-coated adhesive tape to provide a roll of tape having the liner on the outside of each convolution. Preferably, a film is used which is shiny-smooth on one side and matte on the other side to provide an adherency differential, the inside surface in the wound roll being of the latter type. The adhesive tape with its release liner covering is readily unwound from the roll and can be cut to any desired size and then adhered to whatever surface is to be provided with adhesive. The liner remains as a covering and can be peeled off whenever desired to expose the tacky adhesive when adhesive bonding is to be effected to another object.

For example, adhesive tape of this type can be used as "stickyback" for bonding a flexible rubber "flexographic" printing plate to the roll of a rotary printing press for printing labels, tapes, etc. A piece of the tacky double-coated adhesive tape on its liner is adhered to the base surface of the printing plate and trimmed so as to be coextensive therewith; the liner is then peeled off and the plate mounted on the roll. After use, the plate with its accompanying adhesive sheet can be peeled from the roll and the liner sheet can be reapplied over the tacky adhesive surface to cover and protect it during handling and storage of the printing plate. When the plate is to be used again, the liner can be stripped off and the plate again mounted on the printing press roll. This can be repeated several times. This reuse of the liner is made possible by its planar-rigidity and dimensional stability and by its internal unification, the silicone-polymer release surfacing being inseparably bonded to the planar-rigid polyolefin film, and the liner and its exposed surfaces being inert and hydrophobic.

A somewhat similar use is as a liner for pressure-sensitive transfer tape which is supplied in roll form, the adhesive strip being aggressively tacky on both sides. A piece of liner-covered tape is adhered to a suitable base and the liner stripped off whenever desired. Such tape can be laminated to thin foil label stock which can be printed and die cut, the ultimate user removing the liner when he is ready to apply the label.

Another use is as a liner for soft viscoelastic foam-layer tapes and sheets wherein a low-density foamed polyurethane sheeting, for instance, carries an aggressively-tacky pressure-sensitive adhesive coating on each side.

The present film liner need have the silicon release surfacing on only one face when only one side of the liner will be utilized in performing the dry-strippable release function. An example of such use is as a support and adhesive-surface covering for stretchable plasticized polyvinyl chloride film sheetings employed for outdoor or indoor use in signs, indicia, marker lines, protective or decorative wall and shelf coverings and linings, etc. Such film products are usually made by continuous procedures and can be supplied in rolls of long wide sheets, the aggressively-tacky pressure-sensitive adhesive coating being covered by a coextensive dry-strippable liner which protects the adhesive, permits easy unwinding of the roll, and provides temporary support and planar rigidity to the laminated structure during intermediate handling, printing, cutting, etc. The present liner is admirably adapted for such use and can be easily stripped off when desired without distorting the stretchy vinyl film, even when removed from typical sheets of 8 to 36 inch width. Another such use is as a dry-strippable liner for reflex-reflective films used in making outdoor signs and markers and which are coated with pressure-sensitive adhesive so as to be "ready-to-lay," adhering on contact with a sign base or other surface (cf. U.S. Pat. No. 2,407,680).

A related use is as a liner for surface coverings which have an anti-slip backing carrying an aggressively-tacky pressure-sensitive adhesive coating. This sheet product may be supplied in widths of 24 or 36 inches for application on floors, stairways, etc. Because of the highly sticky nature of the adhesive, ordinary silicone treated paper liners cannot be employed.

Still another similar use is as a liner for pressure-sensitive sandblast stencil sheeting which is commonly supplied in long, wide rolls.

My liner may also be used as a support for individually packaged pressure-sensitive first aid bandage strips, and for pressure-sensitive surgical tape strips used as wound closure tapes, etc. The strength and rigidity of the present film liner facilitates high speed machine manufacture of the adhesive strip products without distortion or disruption, and contact of the adhesive-coated strip with the smooth film liner strip results in a smooth adhesive surface.

The invention will now be further clarified by means of illustrative but nonlimitative examples.

DESCRIPTION OF PREFERRED EMBODIMENTS (A)

Polysiloxanes (1) 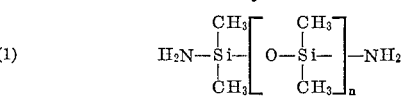

(2) 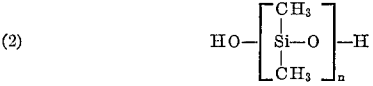

(3) 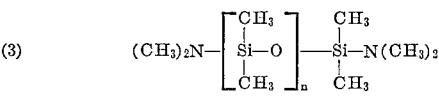

(4) 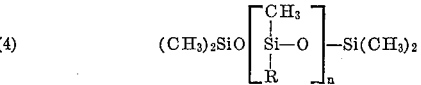

R = approximately 50% —CH$_3$
R = approximately 25% —C$_6$H$_5$
R = approximately 25% (ClCH$_2$CH$_2$O)$_3$SiCH$_2$CH$_2$—

NOTE: In Formula 2 about 5% of the silicon-bonded methyl groups may be replaced by hydroxy or phenyl groups. In Formula 3 a minor proportion of the silicon-bonded methyl groups may be replaced by methyl or phenyl or dimethylamino groups. The subscript $n$ indicates the number of repeating unit groups in the polymer chain and may have a value of the order of 900, for instance.

(B)

Hydrolyzable cross-linkers (5)      $CH_2=CHSi[ON=C(CH_3)(C_2H_5)]_3$
(6)      $CH_2=CHSi(OCH_2CH_2Cl)_3$
(7)      $CH_2=CHSi(OCOCH_3)_3$
(8)      $[(CH_3)_3CO]_2Si(NH_2)_2$ A preferred silicone coating composition consists essentially of the above polysiloxane resin (1) and silane cross-linker (5) in approximately 10 to 1 ratio by weight. This can be provided as a 60% (solids) solution in xylene, which is diluted to 7½% solids by addition of heptane prior to coating. Coatings on corona-treated polypropylene or polyethylene films can be oven dried and cured at 190° F. using an exposure period of 2 to 4 minutes, steam being introduced in the oven atmosphere to provide water for hydrolysis. A silicone composition of this type is commercially available from Dow Corning as silicone "C-4-2045."

Another preferred composition is a solution in xylene-heptane solvent of the above polysiloxane resin (2) and silane cross-linker (7) in 10 to 1 ratio.

When both sides of the polyolefin film are given silicone release coatings, the compositions may be different in order to obtain specifically different properties (such as different degrees of adhesion toward contacting pressure-sensitive adhesive coatings, when employed as a liner for double-coated adhesive sheeting supplied in roll form).

EXAMPLE 1

A "stickyback" printer's tape product was made as follows:

A liner was formed by first extruding a white opaque 3.3-mil film of an isotactic polypropylene composition having a meltflow value of 4.5 and containing 3% by weight of dispersed titanium dioxide pigment ("Tenite" 4231-E, sold by Eastman Chemical Products, Inc.). The film was made by downwardly extruding at 15 lineal feet per minute, a viscous melt as a flat film sheeting at 450° F.; the film dropped into the nip of a pair of 8-inch diameter water-cooled rolls, one of which had a polished chrome-plated surface and the other of which had a soft silicone rubber sleeve, thereby imparting a glossy surface to one side of the film and a matte finish to the other side. The chromium-plated roll was internally cooled with 160° F. water, while the silicone rubber-surfaced roll was internally cooled with 60° F. water. This process, which might be considered a relatively slow quench, results in formation of a film which has a greater degree of crystallinity and larger spherulites than in a more rapidly cooled film, thereby enhancing the desired planar-rigid characteristics.

This film product is "unoriented" in the sense that the film has not been subjected to substantial lengthwise or crosswise stretching (tensilization), or both, such as is sometimes employed in film manufacture to increase toughness. However, a small or incidental degree of polymer orientation is not precluded, such as results when the film is formed by calendering. (Further details on this method of film manufacture will be found in U.S. Pat. 3,396,837.) The stiffness modulus of this liner film was found to be $9.5 \times 10^4$ p.s.i. and the flexural modulus $7.5 \times 10^5$ gms./cm.$^2$ When tested at 200° F. and 250 p.s.i. tensile stresses described hereinabove, the film elongated 2.5%.

The liner film was then primed by electrical corona treatment as described in column 6, lines 6–18 of the aforementioned U.S. Pat. 3,396,837. The glossy surface of the primed film was then coated with a 7½% solids solution (heptane diluent) of Dow Corning silicone C-4-2045, using a 10-mil wire-wound Mayer rod, applying a coating weight of about 0.3 dry grain per 24 square inches and cured at 200° F. for 4 minutes, while introducing live steam into the oven, leaving a calculated thickness of about 1 micron. The matte surface of the film was then coated with silicone in the same manner. Both of the coatings thus produced were rubbed vigorously with firm finger pressure ten times without either perceptibly marring the coating or decreasing its "adhesiveness."

A black stretchy 11-mil (0.3-mm.) film of a plasticized polyvinyl chloride composition pigmented with carbon black, was formed by calendering on a temporary carrier web. It was primed and then coated with a heptane solution of a very aggressive type of pressure-sensitive adhesive compounded essentially of 100 parts natural rubber (latex crepe), 10 parts zinc resinate resin derived from wood rosin, 40 parts of neutral polyterpene tackifier resin having a 115° C. melting point (e.g., "Piccolyte S-115," sold by Pennsylvania Industrial Chemical Co.), and 6 parts of heat-advancing oil-soluble phenolaldehyde resin adapted to cure the rubber component and increase the cohesive strength of the adhesive (e.g., "CKR 1634" resin sold by Union Carbide Corp.), 5 parts tricresyl phosphate, and 1 part rubber antioxidant.

After oven drying, a coextensive sheet of the previously prepared silicone-treated polyolefin film, described above, was laminated to the tacky adhesive surface and the carrier web was stripped off. The exposed face of the vinyl film was similarly primed and coated with the pressure-sensitive adhesive composition and dried. Thus the liner film, which is planar-rigid, functioned as a carrier web during manufacture of the adhesive sheeting. The composite web can be made quite wide (e.g., 30 inches or more) and wound into jumbo rolls which are subsequently slit and wound into smaller rolls of desired length and width (for example a roll of "stickyback" tape 18 inches wide and 1296 inches long). In the wound roll the liner film is interwound with the double-coated adhesive tape or sheet such that the liner is on outside with the dull side facing inwardly.

This "stickyback" tape product is useful for mounting flexographic printing plates in the manner previously described. The adhesive is very aggressively tacky in its normal state, such that the peel adhesion value to clean steel or glass is about 850 grams per inch of width. Thus an 18-inch width of tape has a peel adhesion strength of about 34 lbs., which makes it impossible to successfully employ conventional paper-backed silicone release liners. The present film liner has a sufficiently low adherency to the adhesive surface (despite the intimate continuous contact between smooth faces) to exhibit a stripback adhesion value of only about 114 grams per inch of width. After aging 16 hours at 150° F. as described hereinabove, the peel adhesion of the tape applied to glass exceeds 800 grams per inch of width.

EXAMPLE 2

A lead foil tape product was made as follows:

Lead foil 5 mils in thickness and containing 4% antimony and 0.5% tin (obtained from Johnson Foil Division of Standard Packaging Corp.) was primed, dried, and coated with a heptane solution of a very aggressive type of pressure-sensitive adhesive compounded essentially of 100 parts natural rubber (smoked sheet), 50 parts zinc oxide, 62 parts wood rosin, 15 parts "Piccolyte S-115," 18 parts lanolin oil, 8.5 parts ethyl alcohol, and 1 part rubber antioxidant.

A release liner was prepared as in Example 1, only the glossy side of the film being primed and silicone-coated. This liner was laminated to the tacky adhesive surface and the composite web wound into roll form, with the lead foil backing on the outside.

This product is useful in electroplating operations where it is applied to those portions of substrate surfaces which are to be protected from electrolytic deposition of metal. Tape widths may vary from ½ inch to 18 inches, and the peel adhesion value of the very aggressive adhesive to glass or metal is about 76 oz. per inch of width. The stripback adhesion value for separating the liner from the tape, however, is only about 85 grams per inch. Because the lead foil backing is very easily deformed by high liner removal forces, conventional liners are not satisfactory. Furthermore, conventional paper liners may induce stresses and "buckles" in the lead foil backing because of dimentional change in the paper arising from changes in atmospheric humidity.

EXAMPLE 3

A sandblast stencil tape product was made as follows:

A release liner construction was made as in Example 2.

A 42-mil (1.2-mm.) backing was formed by calendaring on a temporary carrier web a blend of essentially 16 parts crude rubber (smoked sheet), 21 parts SBR rubber (GRS–1504), 25 parts hydrated precipitated calcium silicate, 21 parts amorphous diatomaceous silica, 2.5 parts titanium dioxide, and 2 parts "Piccolyte S–115" resin.

Onto the backing was calendered a 3-mil coating of an aggressively tacky adhesive consisting essentially of 100 parts crude rubber (smoked sheet), 47 parts titanium dioxide, 45 parts hydrated precipitated calcium silicate, 25 parts EDBC polyvinyl ether, 75 parts EDBM polyvinyl ether, 30 parts "Piccolyte S–85," and 30 parts "Piccolyte S–25" (neutral polyterpene tackifier resins having respective melting points of 85° C. and 25° C.).

The glossy surface of a co-extensive sheet of the liner of Example 2, was laminated to the tacky adhesive surface. During this laminating process, the temporary carrier web was removed and the thus-exposed backing surface was dusted with corn starch. The composite web was wound into roll form, with the tape backing on the outside of each convolution.

The stripback force required to separate the liner and the tape was only 12 grams per inch, whereas the peel adhesion of the same tape applied to glass was 60 oz./inch. This peel adhesion was 20 oz./inch higher than that obtained previously with conventional liners because of the mirror smooth adhesive surface generated by the smooth liner film surface.

This tape product is useful in making designs and lettering on stone grave monuments and markers and the like. The lettering is die cut out of the stencil, and the stencil is then placed on the stone and acts to protect the stone from the abrasive action of the sand-blasting except in those areas removed by die cutting.

EXAMPLE 4

A double coated tape product was prepared in the following manner:

A release liner construction was prepared as in Example 1, except that a tan colored film was obtained by substituting "Tenite" polypropylene resin "4241E–92282–Tan" for the polypropylene resin in Example 1.

A paper 2 mils thick and comprised of equal parts of rope and wood fiber, was saturated with 6 grains/24 square inches (dry weight) of a solution in mineral spirits of essentially 100 parts crude rubber (smoked sheet), 100 parts zinc oxide, 100 parts "Piccolyte S–85" resin, and 10 parts Aromatic Plasticizer #25 (a hydrocarbon resin melting at 25° C., available from Pennsylvania Industrial Chemical Company).

After drying, the saturated backing was coated on both sides with a heptane solution of an aggressively tacky adhesive composition consisting essentially of 100 parts crude rubber (smoked sheet), 40 parts zinc oxide, 88 parts "Piccolyte S–115," and 10 parts wood rosin, 10 parts ethyl alcohol, and 1.4 parts rubber antioxidant.

After oven-drying the adhesive web, a co-extensive sheet of the previously prepared release treated polyolefin film, described above, was laminated to the tacky surface and wound into roll form such that the liner formed the outside of each convultion and the matte finished side of the liner film was on the outside of a roll.

The stripback force required to separate the liner and tape was only 30 grams per inch width, even though the peel adhesion of the tape applied to glass was 80 oz./inch.

This tape product is useful in affixing labels, name plates, and the like to various surfaces.

EXAMPLE 5

An adhesive transfer tape product was made as follows:

A release liner construction was made as in Example 1, except that the silicone was diluted to 10% solids, and the matte finished side of the film was coated with silicone solution using a 90 line per inch ruling mill rotogravure cylinder.

Onto the matte finished surface of the liner was coated an adhesive composition consisting of a heptane/ethyl acetate solution of a polymer of a 90:10 isooctyl acrylate: acrylic acid copolymer.

After drying, the adhesive coated web was wound into roll form with the liner on the outside of each convolution of tape and the glossy side of the liner film out. The strip back adhesion was found to be 30 grams per inch and the peel adhesion to glass 50 oz. per inch. This product is extensively used in label manufacture.

EXAMPLE 6

A liner product for tape use was made as follows:

A release liner construction was prepared as in Example 2, except that the silicone used to coat the polypropylene film liner backing was Dow Corning's "Syl-Off" 23, diluted to 10% solids in the manner indicated in Example 2, and catalyzed with 3.6 parts of Dow Corning Catalyst 23A (the tin salt of an organic acid) and 1.8 parts of Dow Corning Catalyst XY–169 (a readily hydrolyzable silane, believed to have isocyanate functionality) per 33 parts of silicone solids.

Rub resistance of this silicone coating was equivalent to that of Examples 1 and 2. When tested for "release" and peel adhesion as discussed in the background of this application, using as a test tape a transparent cellulose acetate backing coated with an adhesive consisting of a 95.5:4.5 copolymer of isooctyl acrylate:acrylic acid copolymer (available from Minnesota Mining and Manufacturing Company as No. 800 Tape), stripback adhesion was 20 grams per inch and peel adhesion to glass was 48 oz./inch. It has been empirically determined that these stripback and peel adhesion values, obtained with this test tape under the specified test conditions, predict the satisfactory performance of a liner coated with that silicone in any of the tape constructions described in Examples 1 through 5.

EXAMPLE 7

Example 6 was repeated, using as the silicone General Electric's SS–4181, diluted to 10% solids as in Example 2 and catalyzed with 4 parts of Catalyst SS–4182C (tin salt of an organic acid) and 3.75 parts of Catalyst SS–4183C (readily hydrolyzable polyfunctional silane). Stripback adhesion was 18 grams per inch and peel adhesion 51 oz. per inch.

EXAMPLE 8

Example 3 is repeated using as the polyolefin a linear polyethylene having a melt index of 6 dg./minute and a density of 0.953 (commercially available from Koppers, Incorporated as "Super Dylan" 6060). The liner has a stiffness modulus of $7 \times 10^4$ p.s.i. and a flexural modulus of $15 \times 10^5$ gms./cm.$^2$. When tested at 200° F. and 250 p.s.i. tensile stress for 3 minutes as described hereinabove, the film elongates 5%. Stripback and peel adhesion tests are comparable to those obtained in Example 3.

What is claimed is:

1. An article having an aggressively-tacky pressure-sensitive adhesive coating in temporary adherent contact with an overlying dry-strippable release liner, said liner consisting essentially of:
a smooth planar-rigid polyolefin film selected from the class consisting of isotactic polypropylene having a melt flow value of 2 to 10 dg./minute and linear polyethylene having a melt index value of 0.2 to 6 dg./minute, said film having:
a thickness of 1 to 4 mils,
a flexural modulus of at least $6.0 \times 10^5$ grams per square centimeter,
ability to resist stretching more than 5% when subjected to a tensile stress of 250 p.s.i. at 200° F. for 3 minutes and
at least one face having been activated to a hydrophilic bondable state, and
inseparably bonded to said one face of said film, a thin cured silicone-polymer coating,
said polymer being of the type which can be cured at 200° F. in 4 minutes or less,
said coating being
extremely thin, on the order of 1 micron thick, smudge-resistant and not removed when rubbed vigorously with a pencil eraser or the thumb,
whereby said article can be removed from said liner with a force of less than 150 grams per inch of width, even after aging for 16 hours at 150° F. and thereafter applied to glass where it resists removal with a force equal to at least 80% of the force required to remove the same article, which has been neither aged nor in contact with said liner.

2. An article according to claim 1 wherein said polyolefin film is an unoriented isotactic polypropylene film having a thickness of about 3 mils.

3. An article according to claim 1 wherein said silicone polymer coating is cured under hydrolyzing conditions and consists essentially of: (A) a silicone release polymer which is a predominately polydimethylsiloxane and that is capable of being poly-functional in silanol hydroxy groups under hydrolyzing condition, and (B) a small proportion of a cross-linker selected from the class consisting of silanes and siloxanes which are capable of being polyfunctional in silanol hydroxy groups under hydrolyzing conditions.

4. An article according to claim 1 wherein the silicone polymer coating is selected from the class consisting of

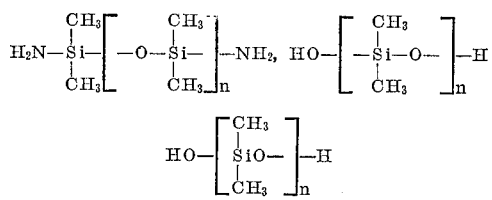

wherein up to 5% of the methyl groups are replaced by hydroxy or phenyl groups,

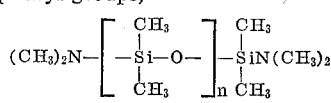

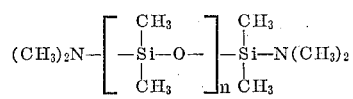

wherein a minor proportion of the methyl groups are replaced by phenyl or dimethylamino groups, and

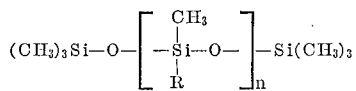

wherein R=approximately 50% —CH$_3$, approximately 25%—C$_6$H$_5$, and approximately 25%

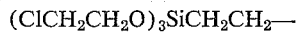

and (B) a small proportion of a cross-linker selected from the class consisting of silanes and siloxanes which are polyfunctional in silanol hydroxy groups under hydrolyzing conditions, and which have the structural formula CH$_2$=CHSi[ON=C(CH$_3$)(C$_2$H$_5$)]$_3$
CH$_2$=CHSi(OCH$_2$CH$_2$Cl)$_3$
CH$_2$=CHSi(OCOCH$_3$)$_3$, or
[(CH$_3$)$_3$CO]$_2$Si(NH$_2$)$_2$ the weight ratio of (A):(B) being approximately 10:1.

5. An article according to claim 2 wherein the isotactic polypropylene film is pigment-opacified and the silicone coating consists essentially of: (A) a silicone release polymer having the structural formula

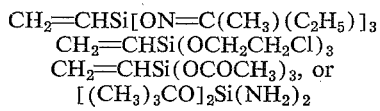

and (B) a cross-linker having the structural formula

CH$_2$=CHSi[ON=C(CH$_3$)(C$_2$H$_5$)]$_3$ the weight ratio of (A):(B) being approximately 10:1.

6. The article of claim 5 wherein the polyolefin film is smooth on one surface and matte-finished on the other.

References Cited

UNITED STATES PATENTS

| | | | |
|---|---|---|---|
| 2,829,073 | 4/1958 | Williams | 206—59X |
| 3,050,411 | 8/1962 | Keil | 117—68.5 |
| 3,076,726 | 2/1963 | Ault et al. | 117—68.5X |
| 3,118,534 | 1/1964 | Groff et al. | 206—59 |
| 3,396,837 | 8/1968 | Schmelze et al. | 206—59 |
| 3,403,045 | 9/1968 | Erikson et al. | 161—208X |

WILLIAM J. VAN BALEN, Primary Examiner

M. A. LITMAN, Assistant Examiner

U.S. Cl. X.R.

117—138.8; 161—247, 406

UNITED STATES PATENT OFFICE
CERTIFICATE OF CORRECTION

Patent No. 3,565,750　　　　　　　Dated February 23, 1971

Inventor(s) Jack L. Evans

It is certified that error appears in the above-identified patent and that said Letters Patent are hereby corrected as shown below:

In Column 2, line 26, "itms" should be -- items --.

In Column 4, line 37, "1%" should be -- 10% --; line 66, "adsorbed" should be -- absorbed --.

In Column 6, line 54 "0-Si" should be -- -O-Si --; line 58 "Si-0" should be -Si-O-; line 62, "Si-0" should be -- -Si-O- --; line 67, the formula

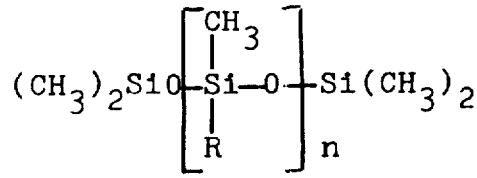

should be --

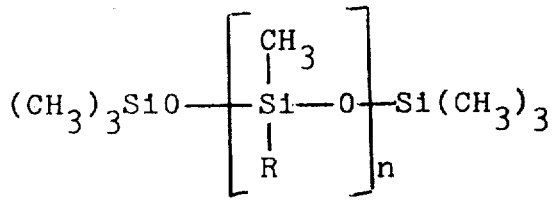

line 69 and 70, delete "R="; line 71, "2" should be -- (2) line 72 "3" should be -- (3) --;

In Column 7, line 37, "meltflow" should be -- melt flow --

In Column 10, line 23, "strip back" should be -- stripbac

In Column 11, line 48, "H" should be $\bar{H}$,--; line 58 "-SiN(C should be -- -SiN($CH_3$)$_2$, --

In Column 12, line 23, 24 and 26 should have commas after

Signed and sealed this 23rd day of January 1973.

(SEAL)
Attest:

EDWARD M. FLETCHER, JR.　　　　　　ROBERT GOTTSCHALK
Attesting Officer　　　　　　　　　　Commissioner of Pat(